LIGHT AMPLIFIERS HAVING THIRD INTERMEDIATE ELECTRODE DISPOSED IN INSULATION TO IMPROVE ELECTROLUMINESCENT MATERIAL-PHOTOCONDUCTIVE MATERIAL IMPEDANCE MATCHING

Filed March 25, 1968

INVENTOR

TADAO KOHASHI

BY Stevens, Davis, Miller & Mosher

ATTORNEYS

United States Patent Office 3,493,768

Patented Feb. 3, 1970

3,493,768

LIGHT AMPLIFIERS HAVING THIRD INTERMEDIATE ELECTRODE DISPOSED IN INSULATION TO IMPROVE ELECTROLUMINESCENT MATERIAL-PHOTOCONDUCTIVE MATERIAL IMPEDANCE MATCHING

Tadao Kohashi, Yokohama, Japan, assignor to Matsushita Electric Industrial Co., Ltd., Osaka, Japan, a corporation of Japan Filed Mar. 25, 1968, Ser. No. 715,622
Claims priority, application Japan, Mar. 31, 1967, 42/20,848
Int. Cl. H01j *31/50*
U.S. Cl. 250—213 5 Claims

ABSTRACT OF THE DISCLOSURE

An energy-sensitive luminescent device having a first and a second electrode and an energy-sensitive layer whose impedance variation in response to excitation by a radiant energy input is utilized to electrically control the luminous intensity of a luminescent layer which luminesces depending on the strength of an electric field applied thereto. In the device, a third electrode is provided independently of the first and second electrodes and is isolated from the energy-sensitive layer by a neutral impedance material.

Figure 1:
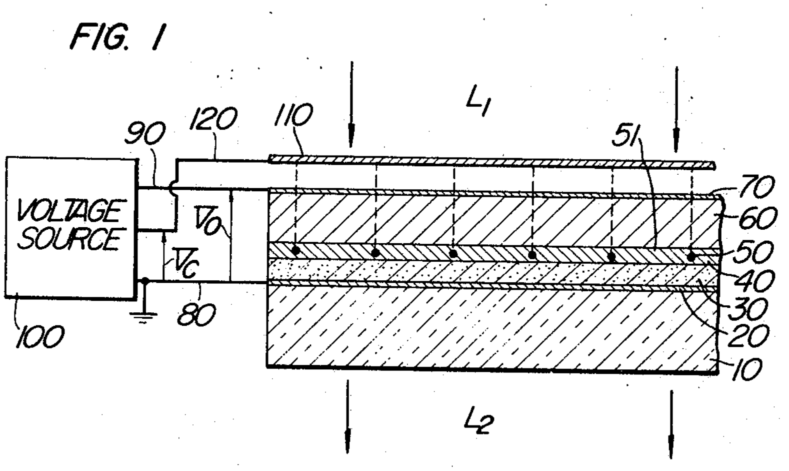

This invention relates to improvements in an energy-sensitive luminescent device of the kind which is based on such a principle that the luminous intensity of a luminescent layer, which luminesces depending on the strength of an electric field applied thereto, is electrically controlled in relation to a variation in the impedance of an energy-sensitive layer in which such an impedance variation takes place in response to excitation by a radiant energy input applied thereto.

In conventional energy-sensitive luminescent devices of this kind, impedance matching between the energy-sensitive layer and the luminescent layer is of extreme importance, and the realization of the devices of this kind is primarily dependent upon a possibility of selecting the material of the energy-sensitive layer which must have a sufficiently high specific resistance or impedance compared with that of the material of the luminescent layer.

With a view to overcome the above difficulty, the inventor proposed previously a luminescent device which was named Phorthicon. This luminescent system comprised a luminescent layer and a neutral impedance layer having an electrode on their respective outer faces, an energy-sensitive layer interposed between the luminescent layer and the neutral impedance layer, and a gapped electrode disposed with the energy-sensitive layer, and was based on such an operating principle that a compensating current is supplied from the side of the neutral impedance layer through the gap portion of the gapped electrode to the luminescent layer in order to cancel out the dark current emanating from the energy-sensitive layer. However, in this system, the compensating current was intercepted by the energy-sensitive layer and could not flow into the luminescent layer when the conductively of the energy-sensitive layer became sufficiently high. In view of the above fact, there was a certain limit to the magnitude of the conductivity of the energy-sensitive material and it was impossible to employ a material having a conductively higher than the above limit.

It has therefore been impossible, as a matter of fact, to construct an energy-sensitive luminous display device by employing such an energy-sensitive material as an infrared-sensitive photoconductive material whose specific resistance in a dark state is generally considerably low, or magnetoresistive material, or piezo-resistive material, or any other material having a low specific resistance or impedance.

It is therefore a primary object of the present invention to provide a novel and improved energy-sensitive luminescent device which enables to employ an energy-sensitive material having a low specific resistance or low impedance.

The energy-sensitive luminescent device according to the present invention comprises a luminescent layer which luminesces depending on the strength of an electric field applied thereto, a first electrode disposed on one side of the luminescent layer, a second electrode disposed on the other side of the luminescent layer, an energy-sensitive layer interposed between the second electrode and the luminescent layer and made of an energy-sensitive material whose impedance is variable in response to excitation by a radiant energy input, a third electrode of gapped structure interposed between and spaced from the first and second electrodes, a neutral impedance material so disposed as to isolate the gapped third electrode from the energy-sensitive material, and a voltage source for voltage supply to these electrodes.

In the energy-sensitive luminescent device according to the present invention which is capable of employing an energy-sensitive material having a low specific resistance, a voltage is applied from the voltage source across the first and second electrodes and across the first and third electrodes in such a manner that the potential of the third electrode equals that of the first electrode and differs from that of the second electrode. Furthermore, in accordance with the present invention, the operating characteristics of the device can be freely controlled or varied over a wide range by arranging in such a way that at least one of the relations between the amplitude, polarity and phase of the two voltages applied across the first and second electrodes and across the first and third electrodes is freely adjustable or variable.

Figure 2:
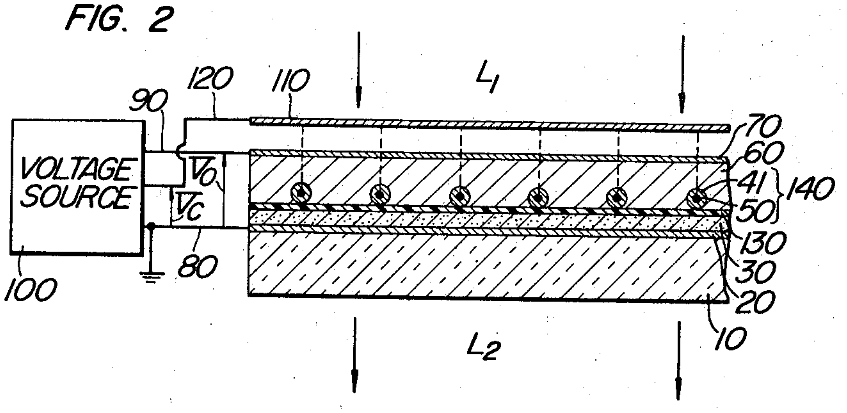

Other objects, advantages and features of the present invention will be apparent from the following description with reference to the accompanying drawings, in which:

FIG. 1 is a schematic longitudinal sectional view of an embodiment of the energy-sensitive luminescent device according to the present invention with an associated power supply system therefor; and FIG. 2 is a schematic longitudinal sectional view of another embodiment according to the present invention with an associated power supply system therefor.

It is to be noted that various parts shown in the figures are depicted in a suitably exaggerated fashion for the convenience of explanation and their relative dimensions are not necessarily in accord with the actual dimensions given in the specification.

Referring first to FIG. 1, the energy-sensitive luminescent device comprises a support base 10 which may be a heat-resisting and light-pervious glass sheet or the like, and a light-pervious first electrode 20 of a metal oxide such as tin oxide deposited on the support base 10. A luminescent layer 30 with a thickness in the order of 30 to 50 microns is stacked on the light-pervious first electrode 20. The luminescent layer 30 is made of electrically luminescent phosphor which may be zinc sulfide which is molded by a plastic, glass enamel or a similar binder.

A second electrode 70 pervious to a radiant energy input $L_1$ is disposed on the side of the electrically luminescent layer 30 which is remote from the first electrode 20.

Intermediate between the second electrode 70 and the electrically luminescent layer 30, there is an energy-sensitive layer 60 made of an energy-sensitive material whose impedance is variable in response to excitation by the radiant energy input $L_1$. In case the radiant energy $L_1$ is infrared radiation, the energy-sensitive layer 60 may preferably be formed by sintering an infrared-sensitive photoconductive material having a low specific resistance such as, for example, (Cd, Hg) Te, or by binding powders of such a material by a plastic, a glass enamel or a similar binder. The energy-sensitive material as such is laminated to have a thickness in the order of 100 to 400 microns. In such an application, the second electrode 70 should be an infrared-ray-pervious conductive film which is obtained by evaporating a metal oxide such as, for example, tin oxide on the energy-sensitive layer 60 in a planar form. However, the second electrode 70 is in no way limited to the shape and structure illustrated in the present embodiment and is not necessarily disposed on the surface of the energy-sensitive layer 60. The second electrode 70 may, for example, have a gapped structure consisting of a plurality of metal wires formed into a parallel grid or a meshed grid and may have at least a portion thereof embedded in the energy-sensitive layer 60. The second electrode 70 may be disposed at any position provided that the energy-sensitive layer 60 is interposed between it and the electrically luminescent layer 30.

A third electrode 50 of gapped structure is disposed at such a position that it does not contact both the first electrode 20 and the second electrode 70. The third electrode 50 is constructed from a plurality of fine wires of a metal such as tungsten having a diameter in the order of 10 to 30 microns, which wires are arranged in the form of a parallel grid or a meshed grid. When the third electrode 50 is in the form of a parallel grid, the pitch between adjacent wires may preferably be 100 to 600 microns, while when the third electrode 50 is in the form of a meshed grid, the mesh of the grid may preferably range from 30 to 250.

In order to isolate the third electrode 50 from the energy-sensitive material forming the energy-sensitive layer 60, a neutral impedance layer 40 with a thickness in the order of 30 to 50 microns is interposed between the electrically luminescent layer 30 and the energy-sensitive layer 60. The neutral impedance layer 40 is formed from a neutral impedance material which may, for example, be a mixture of a powdery light-reflecting material having a high withstand voltage property such as tin oxide ($TiO_2$) or barium titanate ($BaTiO_3$), and a plastic, a glass enamel or a similar binder. The third electrode 50 is bodily embedded in the neutral impedance layer 40 so that the neutral impedance material prevents the third electrode 50 from contacting the energy-sensitive layer 60. The first electrode 20 and the second electrode 70 are connected by way of respective lead wires 80 and 90 to a voltage source 100, which applies a voltage $V_o$ across these electrodes. The third electrode 50 is connected to an external conductive strap 110 and thence connected to the voltage source 100 by way of a lead wire 120 so that a voltage $V_c$ is applied across the first electrode 20 and the third electrode 50. The voltages $V_o$ and $V_c$ may be A.C. voltages which have the same frequency.

Assume now that the third electrode 50 in FIG. 1 is not present. The energy-sensitive layer 60 has a low impedance as described previously. Accordingly, in a state in which there is no radiant energy input $L_1$, an excessively large voltage $V_E=V_{Eo}$, which is a fraction of the voltage $V_o$, is distributed to the stack consisting of the electrically luminescent layer 30 and that portion of the impedance layer 40 which is situated beneath the plane of the electrode 50, and as a result, the electrically luminescent layer 30 delivers an extremely large luminous output $L_2$. Because of the above situation, a reduction in the impedance of the energy-sensitive layer 60 in response to the appearance of a radiant energy input $L_1$ would not cause an appreciable variation in the rate of voltage distribution to the stack consisting of the layers 40 and 30. Thus, the luminous output $L_2$ would vary only slightly in spite of the projection of the radiant energy $L_1$ and it is unable to achieve the desired effective control of the luminous output $L_2$.

On the other hand, when the third electrode 50 is disposed as shown and is supplied with a voltage $V_c$ (including zero volt) whose amplitude is smaller than the amplitude of the voltage $V_E$ which is distributed to the layers 40 and 30 in the absence of any radiant energy input $L_1$, the voltage $V_E$ distributed to the layers 40 and 30, hence the voltage distributed to the electrically luminescent layer 30 can always be made smaller than $V_{Eo}$ irrespective of any phase relation between the voltages $V_o$ and $V_c$. It will thus be understood that the voltage $V_{Eo}$, hence the luminous output $L_2$ delivered in the absense of any radiant energy input $L_1$ can be prevented from becoming excessively high. Thus, projection of the radiant energy input $L_1$ on the device is responded by a reduction in the impedance of the energy-sensitive layer 60, and an increased current flows through the gap portions 51 of the third electrode 50 into the electrically luminescent layer 30 to increase the luminous output $L_2$ of the layer 30. Thus, the luminous intensity of the luminous output $L_2$ relative to the radiant energy input $L_1$ can be controlled at a high rate, and an incident image $L_1$ in the form of the radiant energy can be converted into and luminously displayed as a visible optical output image $L_2$ which is sufficiently bright and which has a suitably high contrast ration.

Consider now a current $I_E$ which flows into the electrically luminescent layer 30. The current $I_E$ increases with an increase in the intensity of the radiant energy input $L_1$ and is represented by the vector sum of photocurrent $I_o$ related with the voltage $V_o$ and photocurrent $I_c$ related with the voltage $V_c$, while the intensity of the luminous output $L_2$ increases non-linearly with an increase in the amplitude $|I_E|=|I_o+I_c|$ of the current $I_E$. Therefore, $|I_E|\rightarrow O$ is an essential requirement that must be satisfied in the absence of any radiant energy input $L_1$ in order to attain the desired purpose of reducing the intensity of the luminous output $L_2$ in the absence of any radiant energy input $L_1$ and enlarging the rate of variation of the luminous output $L_2$ under control of the radiant energy input $L_1$. This requirement is generally achieved by supplying the voltages $V_o$ and $V_c$ from the voltage source 100 in such a relation that the amplitude $|V_c|$ of the voltage $V_c$ applied to the third electrode 50 is smaller than the amplitude $|V_o|$ of the voltage $V_o$ applied to the second electrode 70, thus establishing the relation $|I_o|\doteq|I_c|$, and the currents $I_o$ and $I_c$ have a phase opposite to each other. The opposite phase relation between the currents $I_o$ and $I_c$ can be achieved by so selecting the phase difference $\theta$ between the voltages $V_o$ and $V_c$ as to lie within the range $90°\leq\theta\leq270°$ with due consideration to the impedance angle of the layers 60, 40 and 30. The voltages $V_o$ and $V_c$ may be D.C. voltages, in which case the impedance layer 40 may be rendered suitably resistive and the voltages $V_o$ and $V_c$ may be selected so as to have opposite polarity.

Besides the advantage of an improvement in contrast ratio as described above, another advantage can be derived from the relation $|I_E|=|I_o+I_c|$, that is, such advantage may be obtained by affixing to the voltage source 100 a means for regulating or varying at least one of the relations between the amplitude and phase of the two voltages $V_o$ and $V_c$. By the provision of such a means, $|I_E|$ can be increased, decreased or varied in an inverted-V fashion with an increase in the radiant energy input $L_1$, and the range of variation of $|I_E|$ and the inclination of the characteristic curve of $|I_E|$ with respect to the radiant energy input $L_1$ can freely be regulated or varied. Therefore, the optical output $L_2$ delivered in response to the radiant energy image input $L_1$ takes not only the form of a positive image as described above, but also the form of a visible negative image or a visible mixed negative-positive image. Furthermore, it is possible to freely control or vary the contrast ratio as well as the contrast of those images. In case $V_0$ and $V_c$ are D.C. voltages, at least one of either their voltage value or polarity may be made adjustable or variable in order to effect operations similar to the above.

It will be appreciated that the energy-sensitive luminescent device can perform various operations as described above over a considerably wide range of the impedance or resistance value of the energy-sensitive material forming the energy-sensitive layer 60 since a suitable impedance or resistance given by the neutral impedance material forming the layer 40 is interposed between the energy-sensitive material layer 60 and the third electrode 50.

In FIG. 2, there is shown another embodiment of the present invention with an associated power supply system therefor, and like reference numerals are used therein to denote like parts appearing in FIG. 1. As in the first embodiment, the present embodiment comprises a support base 10, a first electrode 20, an electrically luminescent layer 30, a gapped third electrode 50, an energy-sensitive layer 60, and a second electrode 70. The present embodiment is featured by the fact that individual wires constituting the gapped third electrode 50 are sheathed with a neutral impedance material 41, and since the neutral impedance material is not disposed in a laminar form unlike the preceding embodiment, undesirable voltage loss due to the luminar neutral impedance material can be eliminated and thereby the device can be fabricated very easily.

The third electrode 50 may be constructed, as in the preceding embodiment, from fine wires of a metal such as copper or tungsten having a diameter in the order of 10 to 30 microns, and the individual wires may be sheathed with a covering, about 3 to 10 microns thick, of a neutral impedance material 41 having a high withstand voltage property such as a synthetic resin enamel or glass enamel. Alternatively, fine wires of aluminum may be employed and the surface thereof oxidized to provide an aluminum oxide covering to serve as the neutral impedance material 41. A plurality of electrode elements each consisting of the fine metal wire and the neutral impedance material covering are arranged in parallel to form a parallel grid or woven into the form of a meshed grid, as in the case of the preceding embodiment, to provide a composite electrode 140. The composite electrode 140 is disposed on a light feedback control layer 130 having a thickness in the order of 10 mircons which may be a layer of opaque glass enamel or a layer of a mixture of carbon black and a synthetic resin binder, and the gap portions of the composite electrode 140 are suitably filled with an energy-sensitive material forming the energy-sensitive layer 60. The third electrode 50 is connected to an external conductive strap 110 and thence to a voltage source 100 by way of a lead wire 120 so that a voltage $V_c$ (including zero volt) is applied across the first electrode 20 and the third electrode 50.

The third electrode 50 in this embodiment is illustrated as bodily embedded in the energy-sensitive layer 60. However, the third electrode 50 may be disposed at any position in the device provided that it is interposed between and spaced from the first electrode 20 and the second electrode 70 and is isolated from the energy-sensitive material by the intervening neutral impedance material. More practically, the third electrode 50, hence the composite electrode 140 may be bodily embedded within a single intermediate layer or a plurality of intermediate layers including a light-reflecting layer, an opaque layer and the like interposed between the electrically luminescent layer 30 and the energy-sensitive layer 60, or within the energy-sensitive layer 60, or disposed to extend across the interface between these layer or straddle a plurality of these layers.

The neutral impedance material 41 isolating the third electrode 50 from the energy-sensitive layer 60 may be dispensed with and may be substituted by such a material which forms the electrically luminescent layer or the intermediate layer. Therefore, the term "neutral impedance material" means any suitable material other than the energy-sensitive material forming the energy-sensitive layer 60 which is sensitive to the radiant energy input $L_1$, and any electrical impedance material may be employed provided that it has a sufficient impedance and withstand voltage property for avoiding an electrical short-circuit between the third electrode 50 and the energy-sensitive material.

Although there is no limitation as to the location of disposition of the third electrode 50 as far as the above-specified conditions are satisfied, it is desirable that the energy-sensitive material forming the energy-sensitive layer 60, and the electrically luminescent material forming the electrically luminescent layer 30 may not exist at all or may not substantially exist between the electrically luminescent layer 30 and the third electrode 50. More precisely, it is recommended that the composite electrode 140 interposed between the energy-sensitive layer 60 and the electrically luminescent layer 30 in FIG. 2 may be disposed in such a manner that at least a portion of the composite electrode 140 extends into at least one of the layers 30 and 60.

Although the above description has been given with regard to the use of a photoconductive material to form the energy-sensitive layer by way of example, it will be understood that the present invention includes the use of every energy-sensitive material whose impedance is variable in response to excitation by a radiant energy input, such as a magneto-resistive material whose impedance is variable depending on the strength of a magnetic field, a piezo-resistive material, a pressure-sensitive resistance material, and the like. Furthermore, the working voltage of the device according to the present invention is in no way limited to A.C. voltage, and the device can operate with a D.C. voltage and with a combination of a D.C. voltage and an A.C. voltage. In this latter case, resistivity may be imparted to at least one of the neutral impedance material, the material forming the intermediate layer and the material forming the electrically luminescent layer so as not to obstruct the free flow of direct current into such a layer.

It will be appreciated that the present invention realizes an energy-sensitive luminous display device having a high sensitivity in spite of the inclusion therein of an energy-sensitive material of low impedance and such a high sensitivity can be obtained by the action of the third electrode of gapped structure disposed within the device.

What is claimed is:

1. An energy-sensitive luminescent device having a luminescent layer which luminesces depending on the strength of an electric field applied thereto, a first electrode disposed on one side of said luminescent layer, a second electrode disposed on the other side of said luminescent layer, and an energy-sensitive layer interposed between said second electrode and said luminescent layer and formed from an energy-sensitive material whose impedance is variable in response to excitation by a radiant energy input; said device comprising a third electrode of gapped structure interposed between and spaced from said first and second electrodes, and a neutral impedance material so disposed as to isolate said gapped third electrode from said energy-sensitive material.

2. An energy-sensitive luminescent device according to claim 1, in which said gapped third electrode is in the form of a parallel grid.

3. An energy-sensitive luminescent device according to claim 1, in which said gapped third electrode is in the form of a meshed grid.

4. An energy-sensitive luminescent device according to claim 1, in which said neutral impedance material is disposed in a laminar form.

5. An energy-sensitive luminescent device according to claim 1, in which individual electrode elements of said gapped third electrode are sheathed with said neutral impedance material.

References Cited

UNITED STATES PATENTS

| | | | |
|---|---|---|---|
| 3,210,551 | 10/1965 | Vaughn et al. | 250—213 |
| 3,315,080 | 8/1967 | Kohashi | 250—213 |

RALPH G. NILSON, Primary Examiner

MARTIN ABRAMSON, Assistant Examiner